United States Patent [19]

Patten

[11] B 3,983,332

[45] Sept. 28, 1976

[54] CONFERENCE CALL CIRCUITRY FOR TDM SIGNAL EXCHANGE

[75] Inventor: Michael Allen Patten, San Jose, Calif.

[73] Assignee: International Business Machines Corporation, Armonk, N.Y.

[22] Filed: June 3, 1974

[21] Appl. No.: 475,681

[44] Published under the second Trial Voluntary Protest Program on January 20, 1976 as document No. B 475,681.

[52] U.S. Cl. ......................... 179/1 CN; 179/15 AT; 179/18 BC
[51] Int. Cl.² ......................................... H04M 3/56
[58] Field of Search ......... 179/1 CN, 18 BC, 15 AT

[56] References Cited
UNITED STATES PATENTS

| | | |
|---|---|---|
| 3,551,600 | 12/1970 | Berch ............................. 179/18 BC |
| 3,692,947 | 9/1972 | Lewis.............................. 179/18 BC |
| 3,699,264 | 10/1972 | Pitroda et al. ................... 179/18 BC |
| 3,835,259 | 9/1974 | Medill et al. .................... 179/18 BC |
| 3,870,819 | 3/1975 | Dennis et al. .................... 179/1 CN |

Primary Examiner—Kathleen H. Claffy
Assistant Examiner—Randall P. Myers
Attorney, Agent, or Firm—George E. Roush

[57] ABSTRACT

Conference call provisions are incorporated in a Time Division Multiplex (TDM) signalling exchange wherein the signals are summed energywise and transmitted to a receiving subscriber set without subtracting the signal from that subscriber set and any tendency toward regeneration is obviated by filtered signal reconstruction in conjunction with sample-and-hold signal reconstruction of the TDM signalling system. Simple low-pass, high-pass and band-shaping filters are adequate for the purpose.

13 Claims, 4 Drawing Figures

CONFERENCE CALL CIRCUITRY FOR TDM SIGNAL EXCHANGE

The instant application stems from the same endeavors that produced the copending U.S. Pat. applications Ser. No. 475,683 of Dale Edward Fisk and Merle Edward Homan filed on the 3rd day of June 1974 for "Time-Division Pulse-Multiplex Electric Signal Switching circuit Arrangement", thereafter issued on the 17th day of June 1975 as U.S Pat. No. 3,890,472, and Serial No. 475,682 of Dale Edward Fisk, Merle Edward Homan, Charles Laurie Meiley, Zack Dwayne Reynolds, Robert Vernon Watkins and Fritz S. Wiedmer filed on the 3rd day of June 1974 for "Electric Signal Exchange Switching Circuit Arrangement" and thereafter issued on the 1st day of July 1975 as U.S. Pat. No. 3,892,925.

The invention relates to circuitry for communications systems having electric circuit switching components through which electric signals are translated for distribution among a multiple of terminals, and it particularly pertains to circuitry for effecting conference calls through such switching systems.

There are numerous circuit arrangements in the prior art for conference call communications. Those proposed arrangements coming closest to the circuitry of the invention of which the inventor is aware are to be found in the following U.S. Pats. Nos.:

| | | | |
|---|---|---|---|
| 3,692,947 | 9/1972 | Lewis | 179/18BC |
| 3,699,264 | 10/1972 | Pitroda et al | 179/18BC |

These patented state-of-the-art circuit arrangements are directed to conference calling in systems translating modulated pulse trains having variable repetition rates or varying time intervals between pulses whereas the invention is directed to fixed interval pulse trains or time division multiplex (TDM) systems. The prior art arrangements sum the input signals from all of the subscriber sets and then subtract the signal from the set of the receiving subscriber before transmitting the composite signal to that subscriber. This is done to eliminate any regeneration of that signal in the conference circuitry. Obviously any inaccuracy in the subtractive process allows some regeneration which may be completely detrimental to the transmission. Because the operation is different, the circuitry also differs from that of the invention.

The objects of the invention indirectly referred to hereinbefore and those that will appear as the specification progresses are attained according to the invention by circuitry for translating the input signals without subtracting circuitry and regenerative effects are eliminated by simple low-pass, high-pass and resistance-capacitance (R-C) band-shaping filter circuits interposed in the signal reconstructing circuitry of the TDM signalling system. The sample-and-hold circuitry for the normal TDM communication signal reconstruction is eliminated from the conference calling circuitry in order that the TDM sampling be uniform for any number of different samples received. Thus, as more than two subscriber sets effectively are connected in parallel for conferencing, the conference calling circuitry according to the invention simply is effectively interposed in series with the parallel connected conferring subscriber sets, much in the same manner as though the conferene calling circuitry of the invention were itself a subscriber set.

In order that the full advantage be obtained in the practice of the invention, a preferred embodiment thereof, given by way of example only, is described in detail hereinafter with reference to the accompanying drawing, forming a part of the specification, and in which.

Figure 1:
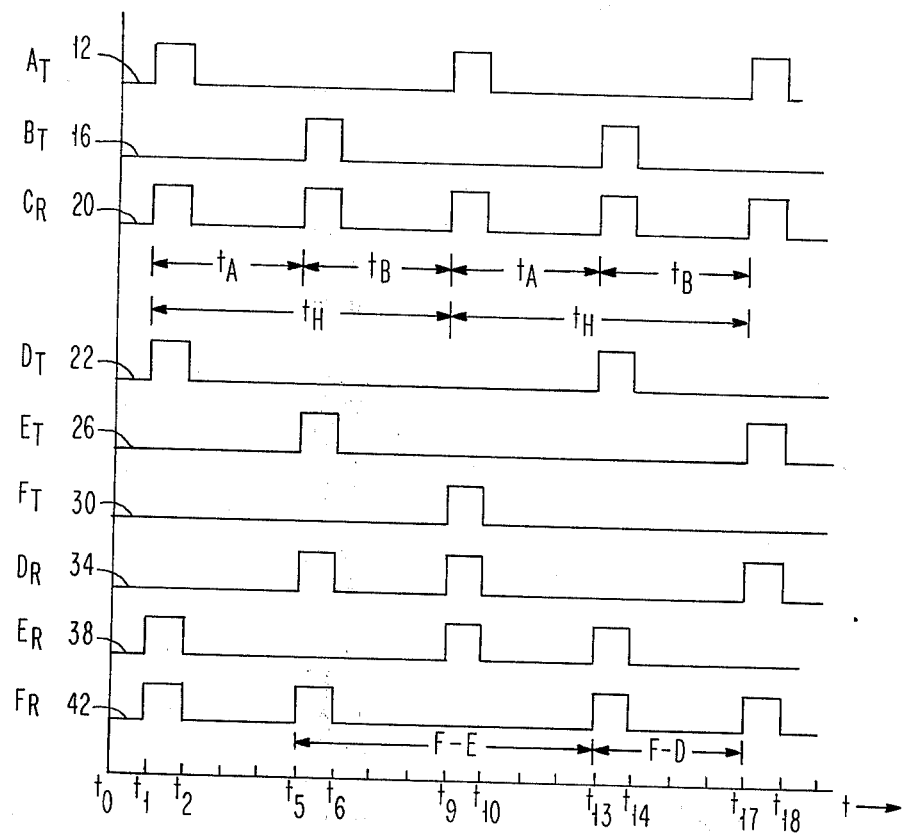
FIG. 1 is a graphical representation of TDM signal waveforms useful in an understanding of the invention.

Some input and output switch timing relationships for a TDM switch exchange connecting two transmitting ports to one receiving port are represented graphically by FIG. 1. A curve 12 depicts a TDM signal from a first (A) subscriber set and another curve 16 depicts a TDM signal from a second (B) subscriber set. A further curve 20 represents the reception of these signals by a third (C) subscriber set. The receiving switch is closed at times $t_A$ and $t_B$ to sample both of the transmitting ports.

It can be seen that if only subscriber A (or B) were transmitting to subscriber C the hold duration $t_H$ for each sample would be twice as long. This would be the case in a standard two-party connection. But in the case shown for a three-party conference the hold duration $t_A$ to $t_B$ is one half the standard duration $t_H$ and therefore only one half as much energy is transferred for each subscriber's set.

With this type of conference connection, the energy transfer capability of the switch is divided among the various talk paths. The amount of energy that each path contributes to the composite received signal is proportional to the length of time the sample-and-hold circuit holds its particular sample before the next sample is received. To illustrate this point, the ideal timing of the switch operation in a three-party conference call is graphically represented by six curves 22 ... 42. The period F–E in which subscriber F receives subscriber E is twice as long as the period F–D in which subscriber F receives subscriber D. The energy transfer compared to a standard connection is 67% for E – F and 33% for D – F. Because the energy transfer is reduced and unequal between various talk paths, even with ideal sampling timing, this method of conference call connection is unsatisfactory. A worst case timing for a three-party conference call in a 128 time slot TDM system results in a transfer of 99.2% for E – F and 0.8% for D – F. In addition to unequal transfer on talk paths the average energy per path decreases with the number of parties. A five-party call gives an average of 25% energy per talk path (–6db) which is further degraded by the fact that even with ideal timing the paths would give a –4 db connection and three –7 db connections. A worst case would give three –5 db connections and one –21 db connection or two –3 db connections and two –21 db connections, and so forth.

Figure 2:
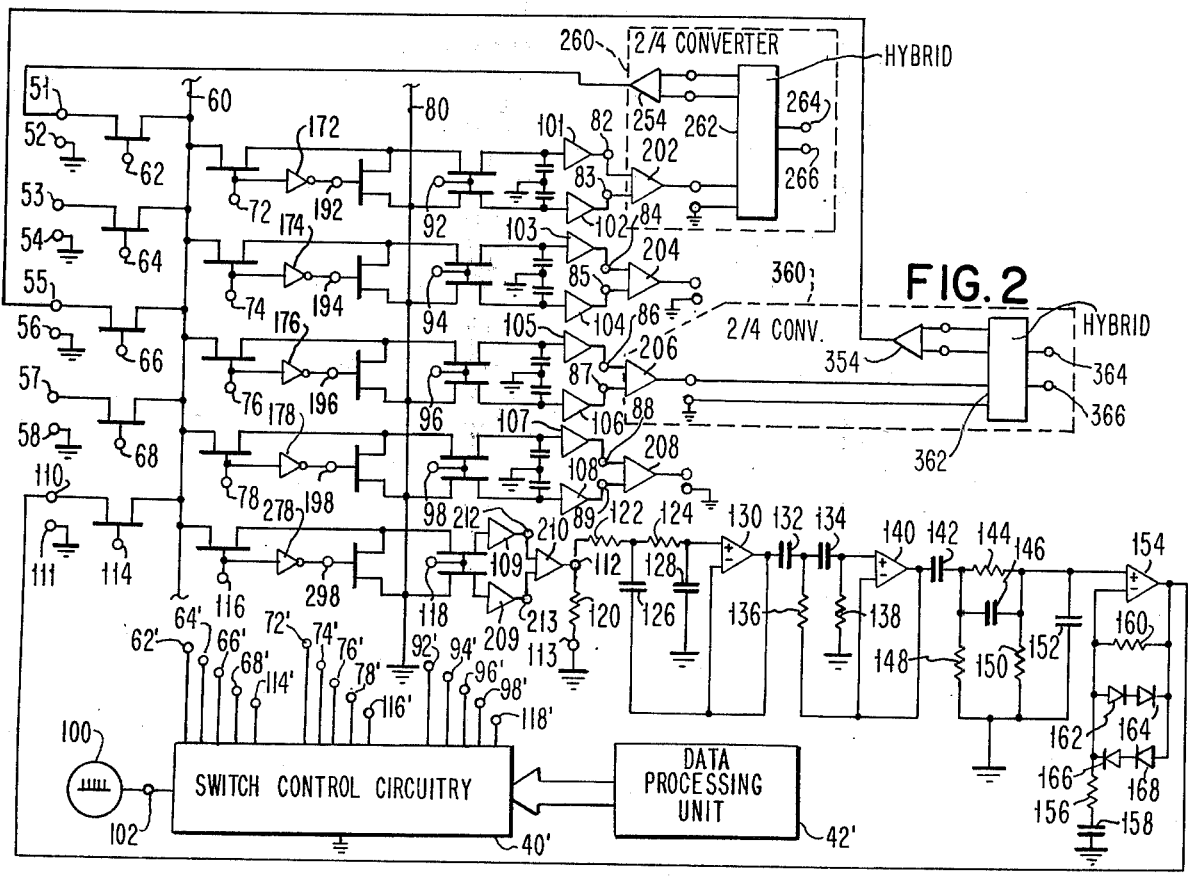
FIG. 2 is a schematic diagram of an embodiment of circuitry according to the invention.

FIG. 2 is a schematic diagram of a multiple-party conference connection using a conference-call circuit according to the invention. The switching exchange as shown in this example is one that is more fully shown and described in the copending U.S. Pat. application Ser. No. 475,682, U.S. Pat. No. 3,892,925 hereinbefore mentioned. A number of two-wire communications lines, for conventional telephone or data set subscribers for example, are terminated in two-to-four wire converting circuits which have one pair of unbalanced terminals and one pair of balanced terminals each. One such converter circuit is connected to each pair of input and a corresponding pair of output terminals in a manner shown for two exemplary converter circuits 260 and 360. Each such converter circuit, as illustrated in FIG. 2 of the prior art U.S. Pat. No. 3,892,925 above-mentioned, has a conventional hybrid circuit 262 (362) internally connected to amplifying circuits 202 (206) and 254 (354) and to line terminals 264,266 (364,366) to which a conventional transmission line is connected. The unbalanced terminals are connected to similar unbalanced terminals 51-52, 53-54, 55-56 and 57-58. The balanced terminals of the converting circuits are connected to corresponding balanced terminals 82-83, 84-85, 86-87 and 99-89. Each pair of input/output terminals is so connected. Thus, these conventional communications circuits each require two electric paths through the switching exchange for one two-way exchange of information. Signals from the input terminal pairs 51-52, 53-54, ... 57-58 are multiplexed onto a node bus 60 (which actually is one of several such busses) in TDM sequence. The node bus 60 in practice exhibits a given capacitance with respect to a plane of fixed reference potential, such as ground. This node bus capacitor is charged in accordance with signal level sampling by applying switching pulses to the terminals 62, 64, ... 68 of electron flow path devices, shown here as field effect transistors (FET). A similar multiple of electron flow path devices are triggered by pulsing terminals 72, 74, ... 78 in TDM sequence to select the bus 60 (which, however, is the only bus shown here) for sampling the signals stored. A uniform ground potential bus 80 is provided as shown. The signal samples in the sample-and-hold circuits are then applied to the balanced output terminals 82-83, 84-85, 86-87 and 88-89 which are connected to converting circuits; by applying a TDM pulse wave to terminals 92, 94, ... 98 of a multiple of output switch elements as shown. The pulse wave required for this operation is preferably under computer control as indicated in the copending patent application mentioned immediately above. Losses through the bus selecting FET are real because there is some current flow in the relatively high resistance state. These losses are minimized with shield FET switches which are closed by applying potential to the control electrode terminals 192, 194, ... 198. This potential is the inverse of that on the corresponding control electrode terminals 72, 74, ... 78. Thus inverting circuits 172, 174, ... 178 as shown are one means satisfactory for applying the proper gating potential. Driver circuits 101, 102, ... 108 having sample-and-hold input circuitry as represented by the capacitors are arranged to feed output differential amplifying circuits 202, 204, ... 208. The above-mentioned circuitry is more completely described and illustrated in the above-mentioned copending U.S. Patent application, now U.S. Pat. No. 3,892,925. Amplitude modulated signals appearing for example at input terminals 51,52 are applied to the node bus 60, which is but one of a number of such node busses in the electric circuit switching facility, by means of a controlled electron flow path device, shown here as a field effect transistor (FET) 62. An amplifying circuit 254 is interposed between the converter 260 and the exchange terminals 51,52 as the design at hand requires. Signal voltage on the node bus 60 is transferred by means of another FET 72 through a sample-and-hold circuit and the amplifier 202 to the output terminal of the latter. The signal gates comprising the FET 62 and 72 are opened and closed in response to square-wave voltages obtained from switch control circuitry 40' in response to a train of timing pulses obtained from a timing pulse train generating circuit 100 and applied at terminals 102. The switching control circuit 40' is alternately a "hard wired" circuit, a manually settable circuit, or preferably circuitry controlled by a programmed data processing unit 42', which alternately also supplies the timing pulse train at terminals 102. Output/square-wave voltages are delivered by switch control circuitry 40' at terminals 62',64',66',68' and 114', 72'... 78 and 116', and 92'...98 and 118'. The first two terminals are connected to the FET 62 and 72 respectively. As stated hereinbefore the node bus 60 in the electric circuit switching facility, will exhibit a large capacitive reactance between the node bus itself and a node of fixed reference potential for the overall circuitry. In some embodiments of the invention, it is considered desirable to discharge this capacitive reactance periodically rather than depend on adjustment of the voltage across the capacitor through the associated components of the circuitry. Another FET (not shown) is therefore connected between the node bus 60 and the point of reference potential, shown here as ground, and pulsed at appropriate times from a square-wave obtained from the switch control circuitry 40'. This discharging will not adversely affect the operation of the conference call circuitry of the invention. The gate electrode terminals 62...68 and 114, 72...78 and 116, and 92...118 are connected to switch control circuit terminals of the same number primed, as 62'...68' and 114' and so on. One purpose of the dual noise-and-signal voltage sample-and-hold circuits shown is to provide common mode noise rejection for nullifying power supply and sampling gate noise.

The conference-call circuit of the invention is connected much as another conference connection of a 2/4 wire converting set but where there is no communications line connected thereto. The conference call circuitry of the invention replaces the four-wire connections of the hybrid circuit with the effective equivalent of the two-wire connections of the hybrid circuit being replaced by the exchange switching circuit connections. The amplifying circuits 210, and 154 in general correspond to the amplifying circuits 202,206 and 254,254 in the 2/4 converting circuits 260,360, although those skilled in the art will modify them as required by the specific requirements at hand. In a simplified description of typical operation, the output terminals at least one of the conferring converter circuits is connected to the node bus establishing thereon the (increment of the) signal for that time slot. That increment of signal is thereafter successively impressed on the input terminals of the conferring converter circuits. Thus each conferee receives that (increment of the) signal. Because of the number of conferring converter circuit connections, the (increment of the) signal is degraded to an undesirable extent. Thus the (increment of the) signal is also impressed on the input terminals of the conference call circuitry in turn and the modified (increment of the) signal as it appears at the output terminals of the conference call circuit from which it is applied in turn to the node bus just as though it were from another conferring subscriber. Thus, the conference call circuit is analogous to another converting circuit and then it "communicates" with the conferring converter circuits through the switching circuitry in much the same way. The output of the conference-call circuit is connected to exchange terminals 110-111 and the input circuit is connected to balanced exchange conference call 212-213 terminals. Electronic switch elements and the corresponding triggering terminals 114, 116, 118 are arranged as described above for "plug-in" or "hard wired" use except for omitting the sample-and-hold capacitors, when the conference circuit is used.

A resistor 120 is connected across terminals 112-113 as shown to discharge the input circuit prior to any reconstructing circuitry after each sample for minimizing any sample-and-hold effect. A pair of series connected resistors 122, 124 and a shunt capacitor 126 constitute a low-pass Tee network filter terminated by a capacitor 128. An integrated circuit type of differential amplifying circuit 130 is connected in negative feedback circuit configuration for stability. A pair of series connected capacitors 132, 134 and a shunt resistor 136 form a Tee network high-pass filter terminated by a resistor 138. Another I-C differential amplifying circuit 140 follows. A Pi network R-C band-shaping filter comprises a coupling capacitor 142, a series resistor 144, a bridging capacitor 146 and two shunt resistors 148-150, terminated by a capacitor 152. An output differential amplifying circuit 154 is arranged with a d.c. gain of unity to minimize d.c. offset gain. A resistor 156 and a capacitor 158 are connected from the reference input terminal to ground. A feedback resistor 160 and four diodes 162, 164, ... 168 limit the output excursions for preventing damage to the semiconductor switching elements of the system. An inverter circuit 278 is connected to terminals 298 and terminal 116 in the same manner as for the other shield FET terminals 192...198. The signal of each party is sampled for the conference circuit, and in turn, the conference circuit output is sampled for each party. The front end of the circuit is a low-pass filter used to reconstruct the sampled input rather than a sample-and-hold amplifier. This enables the circuit to treat from an energy standpoint and otherwise accept all input samples equally no matter how many different samples are received and what the sample timing relationship is. The regeneration plus the low-pass filter produces a peaking in the response around 2 KHz. The 2KHz RC band-shaping network compensates for this. Boosting of low frequency gain is compensated for by the high-pass filter. If the telephone or data set two-to-four wire converters had filtering inputs rather than sample-and-hold input circuits a conference call could be achieved in the manner shown with results similar to the conference circuit connection, however the frequency response is modified by the regenerative feedback path which exists. The feedback loop is due to the feedthrough of signal between the line pack input line and the line pack output line. "Line pack" is a term commonly used in telephone systems work to denote a circuit package having telephone line terminals, audio signal terminals for connecting to the electric signal switching facility, and terminals for applying ringing voltage, busy signal voltage, detecting status changes and the like. Loss of signal in this path is a function of the line pack termed "transhybrid loss."

Figure 3:
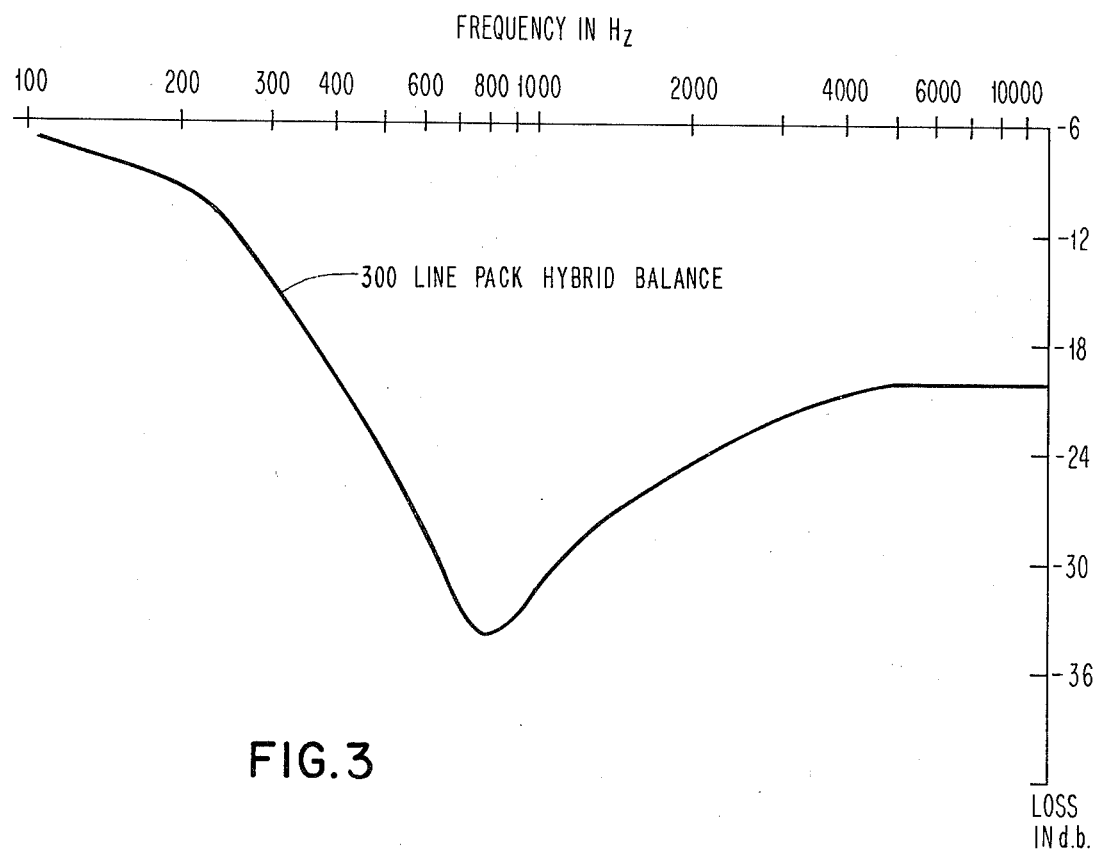
FIG. 3 is a graphical representation of the transhybrid loss of a hybrid circuit with frequency.

The transhybrid loss of a typical line pack is represented graphically by a curve 300 in FIG. 3. Because the balancing is not the same at all frequencies the effect it has on the talk path gain, in a conference connection, varies with frequency. In a three-party conference connection with filter input line packs, the effect on the frequency response of the connection is annoying to the telephone listener because of the boost in low end and high end frequencies with little increase in center frequencies where the intellegibility of speech lies. This effect becomes much worse with additional parties. Because of this a conference connection circuit is necessary on a TDM system with filter signal reconstruction as well as a TDM with sample-and-hold signal reconstruction.

This same problem occurs if a conference call is established on a system with sample-and-hold line pack input with a conference circuit consisting of a low-pass filter only. Because of this, the gain through the conference circuit has been modified to minimize the effect of the frequency variable regeneration, making conference connections with either type of signal reconstruction possible with the one circuit.

Values of components for a specific embodiment are given below by way of example:

| Ref. Nr. | Component | Type or Value |
|---|---|---|
| 120 | Resistor | 1,000 ohm |
| 122 | " | 5,100 " |
| 124 | " | 5,100 " |
| 126 | Capacitor | 0.005 mfd |
| 128 | " | 0.003 " |
| 130 | Differential amplifying circuit 741 | |
| 132 | Capacitor | 0.02 mfd |
| 134 | " | 0.01 " |
| 136 | Resistor | 12,000 ohm |
| 138 | " | 12,000 " |
| 140 | Differential amplifying circuit 741 | |
| 142 | Capacitor | 1 mfd |
| 144 | Resistor | 30 Kilohm |
| 146 | Capacitor | 0.0033 mfd |
| 148 | Resistor | 1 Kilohm |
| 150 | " | 30 " |
| 152 | Capacitor | 0.01 mfd |
| 154 | Differential amplifying circuit 741 | |
| 156 | Resistor | 91 ohm |
| 158 | Capacitor | 6.8 mfd |
| 160 | Resistor | 51 Kilohm |
| 162 | Diode | Type AL |
| 164 | " | Type AL |
| 166 | " | Type AL |
| 168 | " | Type AL |

This circuit was particularly designed for voice telephone conference calling, but those skilled in the art will readily apply the teaching herein to the application at hand as the invention is by no means limited to telephony.

Figure 4:
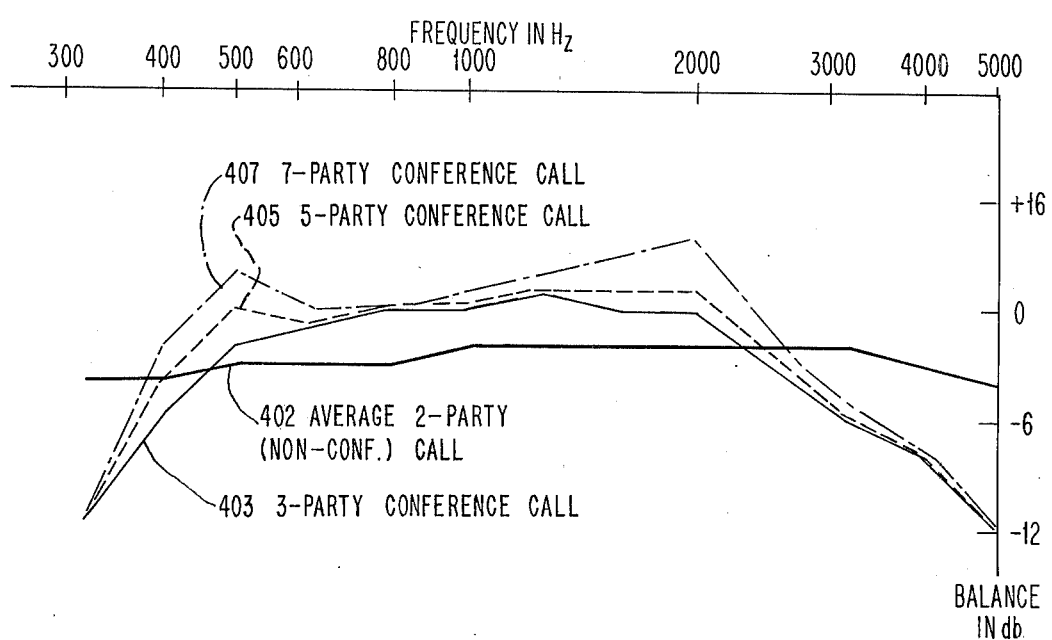
FIG. 4 is a graphical representation of the frequency response of the conference calling circuit according to the invention.

FIG. 4 is a graphical representation of the resultant frequency response using the conference circuit in FIG. 2 in a telephone system using sample-and-hold reconstruction in the line pack circuits. A curve 402 represents the deviation from balance in db for an average two-party, or non-conference, call. Against this norm curves 403, 405 and 403 show the deviation from balance for three, four and five party conference calls respectively when the same conference call circuitry is used in all of the conference calls to render the response sufficiently close to the norm for all practical purposes. The connection established transferred speech with perfect intelligibility with no annoying qualities for connections of seven parties or less. For connections with greater than seven parties peaking is noticeable in the speech. Because of somewhat limited extreme low end and high end voice energy the level of the speech is increased compared to the average non-conference connection, to compensate for the lost energy.

This difference in level may not need to be quite as high as shown in the curves of FIG. 4.

Programming the prior art type of conference connection requires 2 (N–1) commands for arranging to connect or disconnect any one party from the connection. (N is the number of parties in the conference.) This is due to the fact switch must be arranged to connect or disconnect one party from each of the other parties. In using the conference circuit of the invention, only the standard connect and disconnect command sequence of but two commands is necessary. This is due to the fact the switch need be arranged to connect the party from the conference circuit only. It is obvious that the programming tables keeping track of the conference connections are much simpler using this conference circuit.

While the invention has been shown and described particularly with reference to a preferred embodiment thereof, it should be understood that those skilled in the art will make changes without departing from the spirit and the scope of the invention as defined in the appended claims.

The invention claimed is:

1. Conference call circuitry for conferencing more than two subscribers sets connected in a time division electric signal exchange switching circuit arrangement of the type having
    a multiple of pairs of exchange input terminals at which the output signals of subscriber sets are applied,
    one pair of said pairs of input terminals being reserved for said conference call circuitry,
    a multiple of pairs of exchange output terminals at which the output signals for said subscriber sets appear in reconstructed form,
    one pair of said pairs of output terminals being reserved for said conference call circuitry, and
    circuitry connected in said switching circuit arrangement for successively sampling the signals appearing at all of said pairs of input terminals and multiplexing the sampling to all of said pairs of output terminals at a predetermined rate at which at least all of the applied signals are translated individually to said pairs of output signal terminals,
    the improvement comprising said conference call circuitry including
    other input terminals connected to said one reserved pair of exchange output terminals of said switching circuit arrangement,
    other output terminals connected to said one reserved pair of exchange input terminals, and
    signal reconstructing circuitry comprising active and reactive signal modifying components connected between said other input terminals and said other output terminals for compensating for signal regeneration due to conferencing.

2. Conference call circuitry as defined in claim 1 and wherein
    said signal reconstructing circuitry comprises
    low-pass, high-pass, and band-shaping filter circuits, and
    signal amplifying circuitry connected in cascade between said input and output terminals.

3. Conference call circuitry as defined in claim 2 and wherein
    said band-shaping filter circuit is centered around a frequency of 2000 Hertz.

4. Conference call circuitry as defined in claim 3 and wherein
    said low-pass filter circuit has a fall-off frequency characteristic of the order of 600 Hertz.

5. Conference call circuitry as defined in claim 3 and wherein
    said high-pass filter circuit has a fall-off frequency characteristic of the order of 500 Hertz.

6. Conference call circuitry as defined in claim 2 and wherein
    said filter circuits are comprised of resistive and capacitive components.

7. Conference call circuitry as defined in claim 2 and wherein
    said low-pass filter is peaked at a frequency of the order of 2 KiloHertz and the band-shaping filter is arranged to compensate for this peaking.

8. Conference call circuitry as defined in claim 2 and wherein
    the output circuit to said conference call circuitry has a sufficiently low capacitance that the conference call circuitry accepts all input samples substantially equally.

9. Conference call circuitry as defined in claim 2 and wherein
    said signal reconstructing circuitry comprises
    a low-pass resistance-capacitance Pi filter having a fall-off frequency of the order of 600 Hertz,
    a high-pass resistance-capacitance Tee filter having a fall-off frequency of the order of 500 Hertz,
    a band-pass resistance-capacitance shaping filter having a frequency range centered about 2000 Hertz, and
    signal amplifying circuitry connected in cascade between said other input and said other output terminals.

10. Conference call circuitry as defined in claim 9 and wherein
    said amplifying circuitry comprises differential amplifiers interposed in cascade after each filter for compensating for the attenuation thereof.

11. Conference call circuitry as defined in claim 9 and wherein
    said amplifying circuitry is connected in a negative-feedback circuit configuration.

12. Conference call circuitry as defined in claim 9 and incorporating
    components for limiting the output excursions at said other output terminals thereby to protect said switching circuit arrangement from overload damage.

13. Conference call circuitry as defined in claim 12 and wherein
    said limiting components comprise a resistor and at least two diodes oppositely poled.

* * * * *